United States Patent
Mirakyan et al.

(10) Patent No.: US 8,772,206 B2
(45) Date of Patent: Jul. 8, 2014

(54) TREATMENT FLUIDS MADE OF HALOGENISOCYANURIC ACID AND ITS SALTS FOR OPERATIONS IN A WELL

(75) Inventors: Andrey Mirakyan, Katy, TX (US);
Syed A. Ali, Sugar Land, TX (US);
Curtis L. Boney, Houston, TX (US);
Kevin W. England, Houston, TX (US);
Michael D. Parris, Richmond, TX (US);
Kristel A. Blow, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 391 days.

(21) Appl. No.: 12/784,912

(22) Filed: May 21, 2010

(65) Prior Publication Data
US 2011/0287984 A1 Nov. 24, 2011

(51) Int. Cl.
*C09K 8/588* (2006.01)
*C23F 11/14* (2006.01)
*E21B 43/26* (2006.01)

(52) U.S. Cl.
USPC ........... 507/225; 507/239; 507/243; 507/920; 507/922; 166/305.1; 166/308.2

(58) Field of Classification Search
USPC ..................... 507/239, 243, 920, 922, 225; 166/305.1, 308.2
See application file for complete search history.

(56) References Cited

U.S. PATENT DOCUMENTS

| | | | |
|---|---|---|---|
| 2,988,471 A * | 6/1961 | Fuchs et al. ................... | 424/665 |
| 4,565,640 A | 1/1986 | Parks | |
| 4,741,401 A * | 5/1988 | Walles et al. ................. | 166/300 |
| 4,941,537 A * | 7/1990 | Langemeier et al. ......... | 166/300 |
| 5,256,651 A * | 10/1993 | Phelps et al. .................... | 514/53 |
| 5,501,275 A | 3/1996 | Card et al. | |
| 5,510,108 A | 4/1996 | Chouraqui | |
| 5,782,300 A | 7/1998 | James et al. | |
| 5,979,557 A | 11/1999 | Card et al. | |
| 6,239,183 B1 | 5/2001 | Farmer et al. | |
| 6,258,859 B1 | 7/2001 | Dahayanake et al. | |
| 6,435,277 B1 | 8/2002 | Qu et al. | |
| 6,506,710 B1 | 1/2003 | Hoey et al. | |
| 6,703,352 B2 | 3/2004 | Dahayanake et al. | |
| 7,060,661 B2 | 6/2006 | Dobson, Sr. et al. | |
| 7,084,095 B2 | 8/2006 | Lee et al. | |
| 7,303,018 B2 | 12/2007 | Cawiezel et al. | |
| 7,494,957 B2 | 2/2009 | Pena et al. | |
| 7,510,009 B2 | 3/2009 | Cawiezel et al. | |
| 7,531,483 B2 | 5/2009 | Pena et al. | |
| 2004/0040915 A1* | 3/2004 | Connelly, Jr. ................. | 210/756 |
| 2006/0166837 A1 | 7/2006 | Lin et al. | |
| 2008/0190609 A1* | 8/2008 | Robb et al. ..................... | 166/279 |
| 2009/0229827 A1* | 9/2009 | Bryant et al. .............. | 166/308.1 |
| 2010/0190666 A1* | 7/2010 | Ali et al. ....................... | 507/235 |

OTHER PUBLICATIONS

Cyanuric Acid and Cyanuric Chloride—Klaus Huthmacher, Dieter Most. Copyright 2005 Wiley-VCH Verlag GmbH & Co. KGaA, Weinheim 10.1002/14356007.a08-191.

* cited by examiner

*Primary Examiner* — Aiqun Li
(74) *Attorney, Agent, or Firm* — Mathieu Vandermolen; Rachel E. Greene; Tim Curington

(57) ABSTRACT

The invention discloses a method comprising providing a fluid comprising a viscosifying agent in an aqueous medium; contacting the fluid with a halogenisocyanuric acid or halogenisocyanurate component; whereby the viscosity of the fluid with the halogenisocyanuric acid or halogenisocyanurate component is reduced compared to the viscosity of the fluid alone; and introducing the fluid into a well. The halogenisocyanuric acid component can be mono chloroisocyanuric acid, dichloroisocyanuric acid or trichloroisocyanuric acid. The halogenisocyanurate component can be an alkali metal monochloroisocyanurate, alkali metal dichloroisocyanurate or alkali metal trichloroisocyanurate.

20 Claims, 6 Drawing Sheets

TREATMENT FLUIDS MADE OF HALOGENISOCYANURIC ACID AND ITS SALTS FOR OPERATIONS IN A WELL

FIELD OF THE INVENTION

The invention relates to use of composition fluids made with salts of halogenisocyanuric acid. More particularly, the invention relates to use of that fluid for operations in a well from a subterranean petroleum reservoir. Most particularly, the invention relates to use of that produced water for stimulation operations as slickwater.

BACKGROUND

Slickwater fracturing has increased over the past decade with the advent of shale gas plays. Horizontal wells are now the standard with up to 1 million gallons of water in as many as 6 to 9 frac stages per well. The objective is to create as much contact with the reservoir. To pump high-rate fracture stimulation with fresh water or brine, a friction reducer is required. Most friction reducers used in slickwater fracturing are high-molecular-weight polyacrylamide emulsions. These emulsions are easy to disperse and hydrate into water and also easy to pump and meter.

Because these friction reducers are typically pumped at low concentrations (0.5 to 2 gpt), the industry perception has been that these friction reducers are causing little or no damage to the formation. Since polyacrylamides are synthetic polymers, there is a belief that they are difficult to break.

Slickwater fracturing utilizes very large quantities of water with several stages per well which introduces large volumes of friction reducer into the formation. As such, several operators have recently expressed concerns about the possible fracture and formation damage caused by these friction reducers. To minimize formation damage caused by friction reducers, breakers may be required. Some breakers are delayed to allow the friction to be reduced in the tubing where it is most effective. At even low concentrations of 0.25 gallon/1000 gallons of water, results in 250 gallons of potential polymer damage. Once past the perforations, the breaker will break the polymer to reduce the damage. A number of oxidative breakers such as persulfates, organic peroxide and inorganic peroxides have been used. However, there is still a need for an environmentally friendly viscosity breaker for a well treatment fluid that contains a polyacrylamide friction reducer.

SUMMARY

In a first aspect, a method provides a fluid comprising a viscosifying agent in an aqueous medium; contacts the fluid with a halogenisocyanuric acid or halogenisocyanuric component; whereby the viscosity of the fluid with the halogenisocyanuric acid or halogenisocyanuric component is reduced compared to the viscosity of the fluid alone; and introduces the fluid into a well. The halogen can be chlorine or bromine. The chloroisocyanuric acid component can be mono chloroisocyanuric acid, dichloroisocyanuric acid or trichloroisocyanuric acid. The chloroisocyanurate component can be an alkali metal monochloroisocyanurate, alkali metal dichloroisocyanurate or alkali metal trichloroisocyanurate. The bromoisocyanuric acid component can be mono bromoisocyanuric acid, dibromoisocyanuric acid or tribromoisocyanuric acid.

In a second aspect, a method of treating a subterranean formation in a well provides a fluid comprising a viscosifying agent in an aqueous medium; contacts the fluid with a halogenisocyanuric acid or halogenisocyanuric component; whereby the viscosity of the fluid with the halogenisocyanuric acid or halogenisocyanuric component is reduced compared to the viscosity of the fluid alone; introduces the fluid into the well; and allows the fluid to contact the subterranean formation.

DETAILED DESCRIPTION

Figure 1:
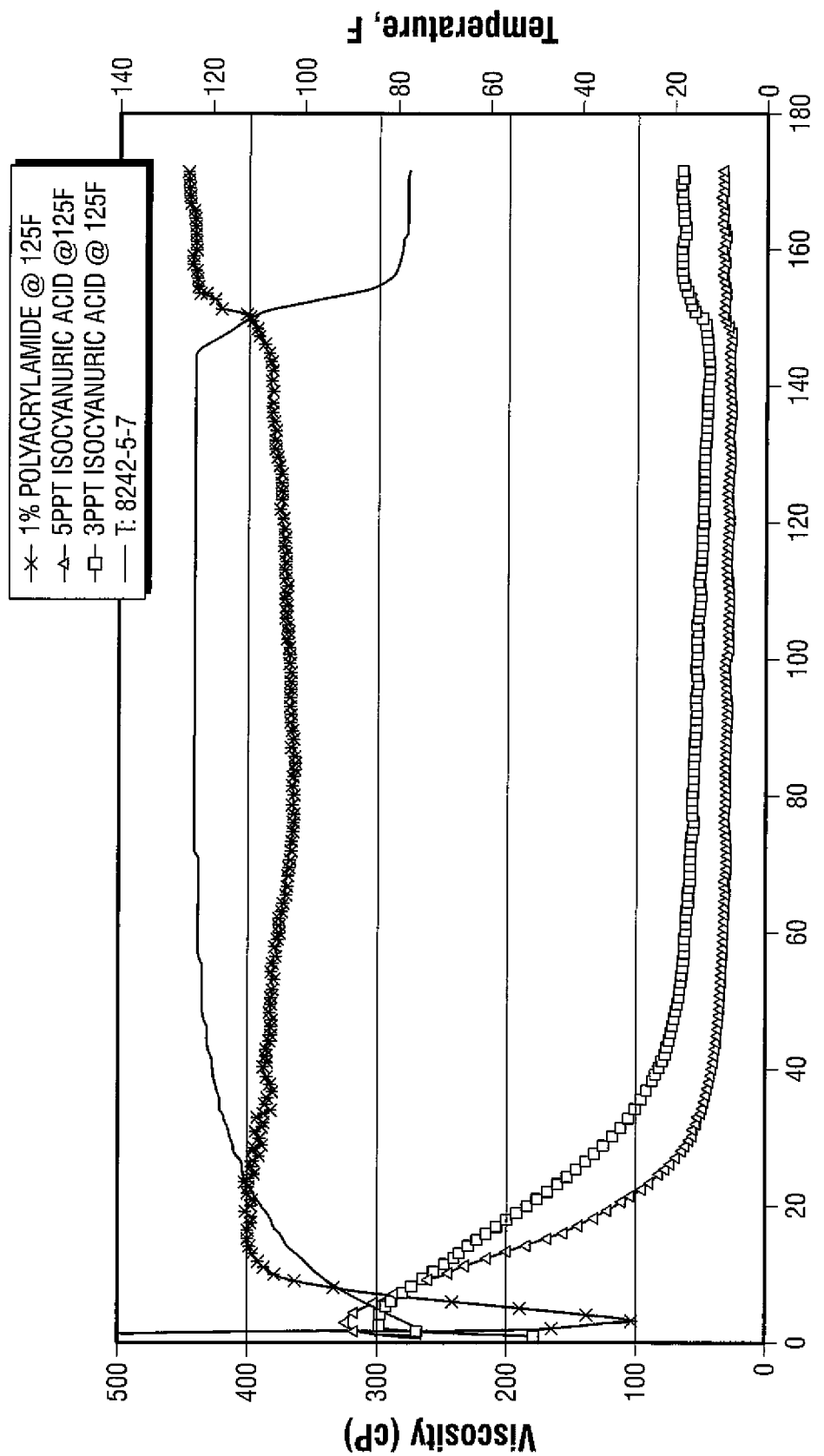
FIG. 1 shows viscosity profiles of 1% polyacrylamide with sodium salt of dichloroisocyanuric acid at 51.5° C.

At the outset, it should be noted that in the development of any actual embodiments, numerous implementation-specific decisions must be made to achieve the developer's specific goals, such as compliance with system- and business-related constraints, which can vary from one implementation to another. Moreover, it will be appreciated that such a development effort might be complex and time consuming but would nevertheless be a routine undertaking for those of ordinary skill in the art having the benefit of this disclosure.

The description and examples are presented solely for the purpose of illustrating the preferred embodiments of the invention and should not be construed as a limitation to the scope and applicability of the invention. While the compositions of the present invention are described herein as comprising certain materials, it should be understood that the composition could optionally comprise two or more chemically different materials. In addition, the composition can also comprise some components other than the ones already cited. In the summary of the invention and this detailed description, each numerical value should be read once as modified by the term "about" (unless already expressly so modified), and then read again as not so modified unless otherwise indicated in context. Also, in the summary of the invention and this detailed description, it should be understood that a concentration range listed or described as being useful, suitable, or the like, is intended that any and every concentration within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors possession of the entire range and all points within the range.

Monochloroisocyanuric, dichloroisocyanuric and trichloroisocyanuric acid are colorless solids that are widely used in civil sanitation, pools and spas, preventing and curing diseases in husbandry and fisheries, fruits and vegetables preservation, wastewater treatment, algaecide for recycling water of industry and air conditioning, anti shrink treatment for woolen, treating seeds, bleaching fabrics, and organic synthesis industry.

Dichloroisocyanuric can be prepared by direct chlorination of cyanuric acid following the formula:

This species is typically converted to its sodium salt, sodium dichloro-s-triazinetrione. Further chlorination gives trichloroisocyanuric acid, $[C(O)NCl]_3$. These N-chloro compounds serve as disinfectants and algicides for swimming pool applications.

The sodium and potassium salts of dichloroisocyanuric acid and trichloroisocyanuric acid have also been used as pool disinfectants. The chlorinated cyanurics hydrolyze in water and provide free available chlorine that is biocidally as effective as inorganic hypochlorites or chlorine gas. The chlorinated cyanurics can be regarded as "green" biocides. It has been found that the addition of as little as 3 ppm of dichloroisocyanurate compound produces a very initial kill rate of bacteria which greatly reduced the bacteria even after 96 hours.

It is well known that chlorine in aqueous solution undergoes a series of complex reactions in the presence of ultraviolet light, resulting in the ultimate reduction in free available chlorine. The addition of 25 ppm or more cyanuric acids to the chlorinated isocyanuric acids stabilizes the free available chlorine and reduces the loss of chlorine due to sunlight exposure. The exact mechanism of protective action is not known, but it is believed that cyanuric acid keeps the free chlorine available at a constant level.

In aqueous solutions, the dichloroisocyanuric acid or chlorinated cyanurates hydrolyze to form hypochlorous acid and a salt of cyanuric acid as indicated in the following equilibrium expression:

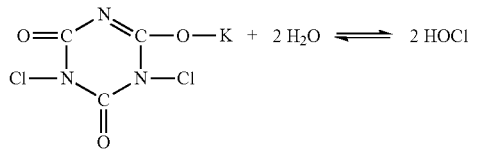

Potassium dichlorocyanurate

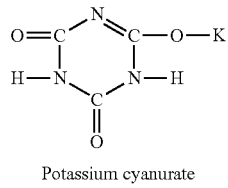

Potassium cyanurate

Hypochlorous acid has outstanding bactericidal power. This is generally attributed to its ability to diffuse through cell walls and thereby reach the vital parts of the bacterial cell. The bactericidal power of a solution of chlorinated isocyanuric acid is directly proportional to the hypochlorous acid concentration of the solution. The percent available chlorine as undissociated hypochlorous acid is therefore the true measure of the bactericidal effectiveness of a solution. A 100 ppm solution of dichloroisocyanuric acid in water generates about 70 ppm of free available chlorine in solution. "Free available chlorine" describes the oxidizing power attributable to chlorine in solution as hypochlorous acid.

According to an embodiment, a fluid using a viscosifying agent with a chloroisocyanuric acid component (or its associated salt) is disclosed. In some embodiments, chloroisocyanuric acids and salts thereof include dichloroisocyanuric acid (DCCA), trichloroisocyanuric acid (TCCA), or alkali metal salts thereof such as sodium dichloroisocyanurate (SDCC) or sodium trichloroisocyanurate (STCC) in either granular or powdered form or combinations thereof. Any reference to such salts herein, whether specific or in general, refers to both the anhydrous form as well as any hydrates thereof.

The fluid can be used in a well treatment fluid in various conventional applications without deleterious consequences or fluid failure. Embodiments include hydraulic fracturing fluids, slickwater, gravel packs, water conformance control, acid fracturing, waterflood, drilling fluids, wellbore cleanout fluids, fluid loss control fluids, kill fluids, spacers, flushes, pushers, and carriers for materials such as scale, paraffin, and asphaltene inhibitors, and the like.

The chloroisocyanuric acid component in an embodiment can also further include a bactericidally effective amount of a bactericide. The bactericide in one embodiment is an organic bactericide that inhibits the growth of bacteria in the aqueous medium, or at least suppresses the expression of enzymes, but may not be effective to denature the enzymes. The bactericide can be beneficial in an embodiment where the hypochlorous acid is not effective to kill or prevent the growth of bacteria in the amount employed, or where the hypochlorous acid and the bactericide have a synergistic effect in either or both the denaturing of enzymes or the destruction of bacteria. Representative examples of bactericides include glutaraldehyde, tetrakishydroxymethyl phosphonium sulfate, and the like.

The present embodiments and examples are discussed herein with specific reference to hydraulic fracturing, but it is also suitable for gravel packing, or for fracturing and gravel packing in one operation (called, for example frac and pack, frac-n-pack, frac-pack, StimPac treatments, or other names), which are also used extensively to stimulate the production of hydrocarbons, water and other fluids from subterranean formations. These operations involve pumping a slurry of "proppant" (natural or synthetic materials that prop open a fracture after it is created) in hydraulic fracturing or "gravel" in gravel packing. In low permeability formations, the goal of hydraulic fracturing is generally to form long, high surface area fractures that greatly increase the magnitude of the pathway of fluid flow from the formation to the wellbore. In high permeability formations, the goal of a hydraulic fracturing treatment is typically to create a short, wide, highly conductive fracture, in order to bypass near-wellbore damage done in drilling and/or completion, to ensure good fluid communication between the rock and the wellbore and also to increase the surface area available for fluids to flow into the wellbore.

Viscosifying agents can include polymers, including crosslinked or un-crosslinked polymers, friction-reduction additive, viscoelastic surfactant systems (VES), fiber viscosification systems, mixed fiber-polymer and fiber-VES systems, slickwater (low viscosity) systems.

Embodiments of polymer viscosifiers include, for example, polysaccharides such as substituted galactomannans, such as guar gums, high-molecular weight polysaccharides composed of mannose and galactose sugars, or guar derivatives such as hydroxypropyl guar (HPG), carboxymethylhydroxypropyl guar (CMHPG) and carboxymethyl guar (CMG), hydrophobically modified guars, guar-containing compounds, and synthetic polymers. Crosslinking agents based on boron, titanium, zirconium or aluminum complexes are typically used to increase the effective molecular weight of the polymer and make them better suited for use in high-temperature wells.

Other embodiments of effective water-soluble polymers (provided that specific examples chosen are compatible with the denaturants of the invention) include polyvinyl polymers, polymethacrylamides, cellulose ethers, lignosulfonates, and ammonium, alkali metal, and alkaline earth salts thereof. More specific examples of other typical water soluble polymers are acrylic acid-acrylamide copolymers, acrylic acid-methacrylamide copolymers, polyacrylamides, partially hydrolyzed polyacrylamides, partially hydrolyzed polymethacrylamides, polyvinyl alcohol, polyvinyl acetate, polyalkyleneoxides, carboxycelluloses, carboxyalkylhydroxyethyl celluloses, hydroxyethylcellulose, other galactomannans, heteropolysaccharides obtained by the fermentation of starch-derived sugar (e.g., xanthan gum), and ammonium and alkali metal salts thereof.

Cellulose derivatives are also used in an embodiment, such as hydroxyethylcellulose (HEC) or hydroxypropylcellulose (HPC), carboxymethylhydroxyethylcellulose (CMHEC) and carboxymethycellulose (CMC), with or without crosslinkers. Xanthan, diutan, and scleroglucan, three biopolymers, have been shown to have excellent proppant-suspension ability even though they are more expensive than guar derivatives and therefore have been used less frequently unless they can be used at lower concentrations.

Friction reducing polymers can be used in another embodiment for slickwater treatments. More particularly, the friction reducing polymers are anionic friction reducing polymers. Suitable anionic friction reducing polymers should reduce energy losses due to turbulence within the treatment fluid. Those of ordinary skill in the art will appreciate that the anionic friction reducing polymer(s) included in the treatment fluid should have a molecular weight sufficient to provide a desired level of friction reduction. In general, polymers having higher molecular weights may be needed to provide a desirable level of friction reduction. By way of example, the average molecular weight of suitable anionic friction reducing polymers may be at least about 2,500,000, as determined using intrinsic viscosities. In certain exemplary embodiments, the average molecular weight of suitable anionic friction reducing polymers may be in the range of from about 7,500,000 to about 20,000,000. Those of ordinary skill in the art will recognize that anionic friction reducing polymers having molecular weights outside the listed range may still provide some degree of friction reduction.

A wide variety of anionic friction reducing polymers may be suitable for use with the present technique. By way of example, suitable anionic friction reducing polymers may comprise any of a variety of monomeric units, including acrylamide, acrylic acid, 2-acrylamido-2-methylpropane sulfonic acid, N,N-dimethylacrylamide, vinyl sulfonic acid, N-vinyl acetamide, N-vinyl formamide, itaconic acid, methacrylic acid, acrylic acid esters, methacrylic acid esters and combinations thereof.

One example of a suitable anionic friction reducing polymer is a polymer comprising acrylamide and acrylic acid. The acrylamide and acrylic acid may be present in the polymer in any suitable concentration. An example of a suitable polymer may comprise acrylamide in an amount in the range of from about 5% to about 95% and acrylic acid in an amount in the range of from about 5% to about 95%. Another example of a suitable polymer may comprise acrylamide in an amount in the range of from about 60% to about 90% by weight and acrylic acid in an amount in the range of from about 10% to about 40% by weight. Another example of a suitable polymer may comprise acrylamide in an amount in the range of from about 80% to about 90% by weight and acrylic acid in an amount in the range of from about 10% to about 20% by weight. Yet another example of a suitable polymer may comprise acrylamide in an amount of about 85% by weight and acrylic acid in an amount of about 15% by weight. As previously mentioned, one or more additional monomers may be included in the polymer comprising acrylamide and acrylic acid. By way of example, the additional monomer(s) may be present in the anionic friction reducing polymers in an amount up to about 20% by weight of the polymer.

Friction reducing polymers can also include guar, and derivativized guar, such as hydroxylpropyl guar (HPG), carboxymethlhydroxypropyl guar (CMHPG), and others, cellulose polymers including hydroxyethylcellulose (HEC), carboxymethylhydroxyethyl cellulose (CMHEC), starch and starch derivatives, biopolymers such as xanthan and derivatives of biopolymers, and surfactant based systems such as viscoelastic surfactant fluids.

Linear (not cross-linked) polymer systems can be used in another embodiment, but generally require more polymer for the same level of viscosification.

All crosslinked polymer systems may be used, including for example delayed, optimized for high temperature, optimized for use with sea water, buffered at various pH's, and optimized for low temperature. Any crosslinker may be used, for example boron, titanium, and zirconium. Suitable boron crosslinked polymers systems include by non-limiting example, guar and substituted guars crosslinked with boric acid, sodium tetraborate, and encapsulated borates; borate crosslinkers may be used with buffers and pH control agents such as sodium hydroxide, magnesium oxide, sodium sesquicarbonate, and sodium carbonate, amines (such as hydroxyalkyl amines, anilines, pyridines, pyrimidines, quinolines, and pyrrolidines, and carboxylates such as acetates and oxalates) and with delay agents such as sorbitol, aldehydes, and sodium gluconate. Suitable zirconium crosslinked polymer systems include by non-limiting example, those crosslinked by zirconium lactates (for example sodium zirconium lactate), triethanolamines, 2,2'-iminodiethanol, and with mixtures of these ligands, including when adjusted with bicarbonate. Suitable titanates include by non-limiting example, lactates and triethanolamines, and mixtures, for example delayed with hydroxyacetic acid. Any other chemical additives can be used or included provided that they are tested for compatibility with the fibers and fiber degradation products of the invention (neither the fibers or their degradation products or the chemicals in the fluids interfere with the efficacy of one another or with fluids that might be encountered during the job, like connate water or flushes). For example, some of the standard crosslinkers or polymers as concentrates usually contain materials such as isopropanol, n-propanol, methanol or diesel oil.

As mentioned, viscoelastic surfactant fluid systems (such as cationic, amphoteric, anionic, nonionic, mixed, and zwitterionic viscoelastic surfactant fluid systems, especially betaine zwitterionic viscoelastic surfactant fluid systems or amidoamine oxide surfactant fluid systems) may be also used provided that they are tested for compatibility with the denaturant and denaturant degradation products of the invention. Non-limiting examples include those described in U.S. Pat. Nos. 5,551,516; 5,964,295; 5,979,555; 5,979,557; 6,140,277; 6,258,859 and 6,509,301, all hereby incorporated by reference. The solid acid/pH control agent combination of this invention has been found to be particularly useful when used with several types of zwitterionic surfactants. In general, suitable zwitterionic surfactants have the formula:

$$RCONH-(CH_2)_a(CH_2CH_2O)_m(CH_2)_b-N^+(CH_3)_2-(CH_2)_{a'}(CH_2CH_2O)_{m'}(CH_2)_{b'}COO^-$$

in which R is an alkyl group that contains from about 17 to about 23 carbon atoms which may be branched or straight chained and which may be saturated or unsaturated; a, b, a', and b' are each from 0 to 10 and m and m' are each from 0 to 13; a and b are each 1 or 2 if m is not 0 and (a+b) is from 2 to about 10 if m is 0; a' and b' are each 1 or 2 when m' is not 0 and (a'+b') is from 1 to about 5 if m is 0; (m+m') is from 0 to about 14; and $CH_2CH_2O$ may also be oriented as $OCH_2CH_2$. Preferred surfactants are betaines.

Two examples of commercially available betaine concentrates are, respectively, BET-O-30 and BET-E-40. The VES surfactant in BET-O-30 is oleylamidopropyl betaine. It is designated BET-O-30 because as obtained from the supplier (Rhodia, Inc. Cranbury, N.J., U.S.A.) it is called Mirataine BET-O-30; it contains an oleyl acid amide group (including a $C_{17}H_{33}$ alkene tail group) and is supplied as about 30% active surfactant; the remainder is substantially water, sodium chloride, glycerol and propane-1,2-diol. An analogous suitable material, BET-E-40, was used in the experiments described above; one chemical name is erucylamidopropyl betaine. BET surfactants, and others that are suitable, are described in U.S. Pat. No. 6,258,859. Certain co-surfactants may be useful in extending the brine tolerance, to increase the gel strength, and to reduce the shear sensitivity of VES fluids, in particular for BET-O-type surfactants. An example given in U.S. Pat. No. 6,258,859 is sodium dodecylbenzene sulfonate (SDBS). VES's may be used with or without this type of co-surfactant, for example those having a SDBS-like structure having a saturated or unsaturated, branched or straight-chained $C_6$ to $C_{16}$ chain; further examples of this type of co-surfactant are those having a saturated or unsaturated, branched or straight-chained $C_8$ to $C_{16}$ chain. Other suitable examples of this type of co-surfactant, especially for BET-O-30, are certain chelating agents such as trisodium hydroxyethylethylenediamine triacetate.

In another embodiment, suitable fibers can assist in transporting, suspending and placing proppant in hydraulic fracturing and gravel packing and can optionally also degrade to minimize or eliminate the presence of fibers in the proppant pack without releasing degradation products that either a) react with certain multivalent ions present in the fracture water or gravel packing carrier fluid, or formation water to produce materials that hinder fluid flow, or b) decrease the ability of otherwise suitable metal-crosslinked polymers to viscosify the carrier fluid. Systems in which fibers and a fluid viscosified with a suitable metal-crosslinked polymer system or with a VES system are known to the skilled artisan to slurry and transport proppant as a "fiber assisted transport" system, "fiber/polymeric viscosifier" system or an "FPV" system, or "fiber/VES" system. Most commonly the fiber is mixed with a slurry of proppant in crosslinked polymer fluid in the same way and with the same equipment as is used for fibers used for sand control and for prevention of proppant flowback, for example, but not limited to, the method described in U.S. Pat. No. 5,667,012. In fracturing, for proppant transport, suspension, and placement, the fibers are normally used with proppant or gravel laden fluids, not normally with pads, flushes or the like.

Any conventional proppant (gravel) can be used. Such proppants (gravels) can be natural or synthetic (including but not limited to glass beads, ceramic beads, sand, and bauxite), coated, or contain chemicals; more than one can be used sequentially or in mixtures of different sizes or different materials. The proppant may be resin coated, preferably pre-cured resin coated, provided that the resin and any other chemicals that might be released from the coating or come in contact with the other chemicals of the Invention are compatible with them. Proppants and gravels in the same or different wells or treatments can be the same material and/or the same size as one another and the term "proppant" is intended to include gravel in this discussion. In general the proppant used will have an average particle size of from about 0.15 mm to about 2.39 mm (about 8 to about 100 U.S. mesh), more particularly, but not limited to 0.25 to 0.43 mm (40/60 mesh), 0.43 to 0.84 mm (20/40 mesh), 0.84 to 1.19 mm (16/20), 0.84 to 1.68 mm (12/20 mesh) and 0.84 to 2.39 mm (8/20 mesh) sized materials. Normally the proppant will be present in the slurry in a concentration of from about 0.12 to about 0.96 kg/L, preferably from about 0.12 to about 0.72 kg/L, preferably from about 0.12 to about 0.54 kg/L. The viscosified proppant slurry can be designed for either homogeneous or heterogeneous proppant placement in the fracture, as known in the art.

Also optionally, the fracturing fluid can contain materials designed to limit proppant flowback after the fracturing operation is complete by forming a porous pack in the fracture zone. Such materials can be any known in the art, such as fibers, such as glass fibers, available from Schlumberger under the trade name PropNET™ (for example see U.S. Pat. No. 5,501,275). Exemplary proppant flowback inhibitors include fibers or platelets of novoloid or novoloid-type polymers (U.S. Pat. No. 5,782,300). Thus the fracturing system may contain different or mixed fiber types, for example non-degradable or degradable only at a higher temperature, present primarily to aid in preventing proppant flowback. The system may also contain another fiber, such as a polyethylene terephthalate fiber, which is also optimized for assisting in transporting, suspending and placing proppant, but has a higher degradation temperature and would precipitate calcium and magnesium without preventive measures being taken. As has been mentioned, appropriate preventive measures may be taken with other fibers, such as, but not limited to, pumping a pre-pad and/or pumping an acid or a chelating dissolver, adsorbing or absorbing an appropriate chelating agent onto or into the fiber, or incorporating in the fluid precipitation inhibitors or metal scavenger ions that prevent precipitation.

Any additives normally used in such well treatment fluids can be included, again provided that they are compatible with the other components and the desired results of the treatment. Such additives can include, but are not limited to breakers, anti-oxidants, crosslinkers, corrosion inhibitors, delay agents, biocides, buffers, fluid loss additives, pH control agents, solid acids, solid acid precursors, etc. The wellbores treated can be vertical, deviated or horizontal. They can be completed with casing and perforations or open hole.

Fluid technologies incorporating a gaseous component or a supercritical fluid to form a foam or energized fluid are commonly used in the stimulation of oil and gas wells. For example, some viscoelastic fluids used as fracturing fluids contain a gas such as air, nitrogen or carbon dioxide to provide an energized fluid or foam. Such fluids are commonly formed by injecting an aqueous solution ("base fluid") concomitantly with a gas, most commonly nitrogen, carbon dioxide or their mixtures, into the formation. Among other benefits, the dispersion of the gas into the base fluid in the form of bubbles or droplets increases the viscosity of such fluid and impacts positively its performance, particularly its ability to effectively induce hydraulic fracturing of the formation, and also its capacity to carry solids ("proppants") that are placed within the fractures to create pathways through which oil or gas can be further produced. The presence of the gas also enhances the flowback of the base fluid from the interstices of the formation and of the proppant pack into the wellbore, due to the expansion of such gas once the pressure is reduced at the wellhead at the end of the fracturing operation. Other common uses of foams or energized fluids include wellbore cleanout, gravel packing, acid diversion, fluid loss control, and the like. U.S. Pat. No. 7,494,957 and U.S. Application Publication Nos. US2006/0166837 and US2006/0178276, each of which is incorporated by reference in its entirety, describe that by combining a heteropolysaccharide, concomitantly with a gas, an electrolyte, and a surfactant, an aqueous energized fluid is provided with exceptional rheology properties, particle suspension and particle transport capabilities, as well as gas phase stability, especially at elevated temperatures. As such, aqueous energized fluids may include an aqueous medium, a gas component, a heteropolysaccharide, an electrolyte, and a surfactant. The aqueous medium is usually water or brine. The fluids may also include an organoamino compound.

The viscosity of the fluid in which the gas is dispersed affects the resulting viscosity and stability of the foam. In general, foams are more stable and viscous as the viscosity of the base fluid increases. For this reason, high molecular weight polymers are commonly added to increase the viscosity of the base fluid. Commonly used polymers for fracturing applications are polysaccharides such as cellulose, derivatized cellulose, guar gum, derivatized guar gum, xanthan gum, or synthetic polymers such as polyacrylamides and polyacrylamide copolymers.

Foamed and energized fracturing fluids invariably contain "foamers", most commonly surfactants or blends of surfactants that facilitate the dispersion of the gas into the base fluid in the form of small bubbles or droplets, and confer stability to the dispersion by retarding the coalescence or recombination of such bubbles or droplets. Foamed and energized fracturing fluids are generally described by their foam quality, i.e. the ratio of gas volume to the foam volume. If the foam quality is between 52% and 95%, the fluid is conventionally called foam, and below 52%, an energized fluid. However, as used herein the term "energized fluid" is defined as any stable mixture of gas and liquid, notwithstanding the foam quality value.

To facilitate a better understanding of the present embodiments, the following examples are given. In no way should the following examples be read to limit, or define, the scope of the invention.

EXAMPLES

A series of experiments were conducted to compare effectiveness of chloroisocyanuric acid to decrease the viscosity of treatment fluid samples.

Various amounts of sodium salt of dichloroisocyanuric acid were used to efficiently reduce the viscosity of polyacrylamide solution at 51.5° C.-79.5° C. temperature range. The obtained data prove that sodium salt of dichloroisocyanuric acid can be an effective breaker for slickwater fluids in low to medium temperature range.

Figure 2:
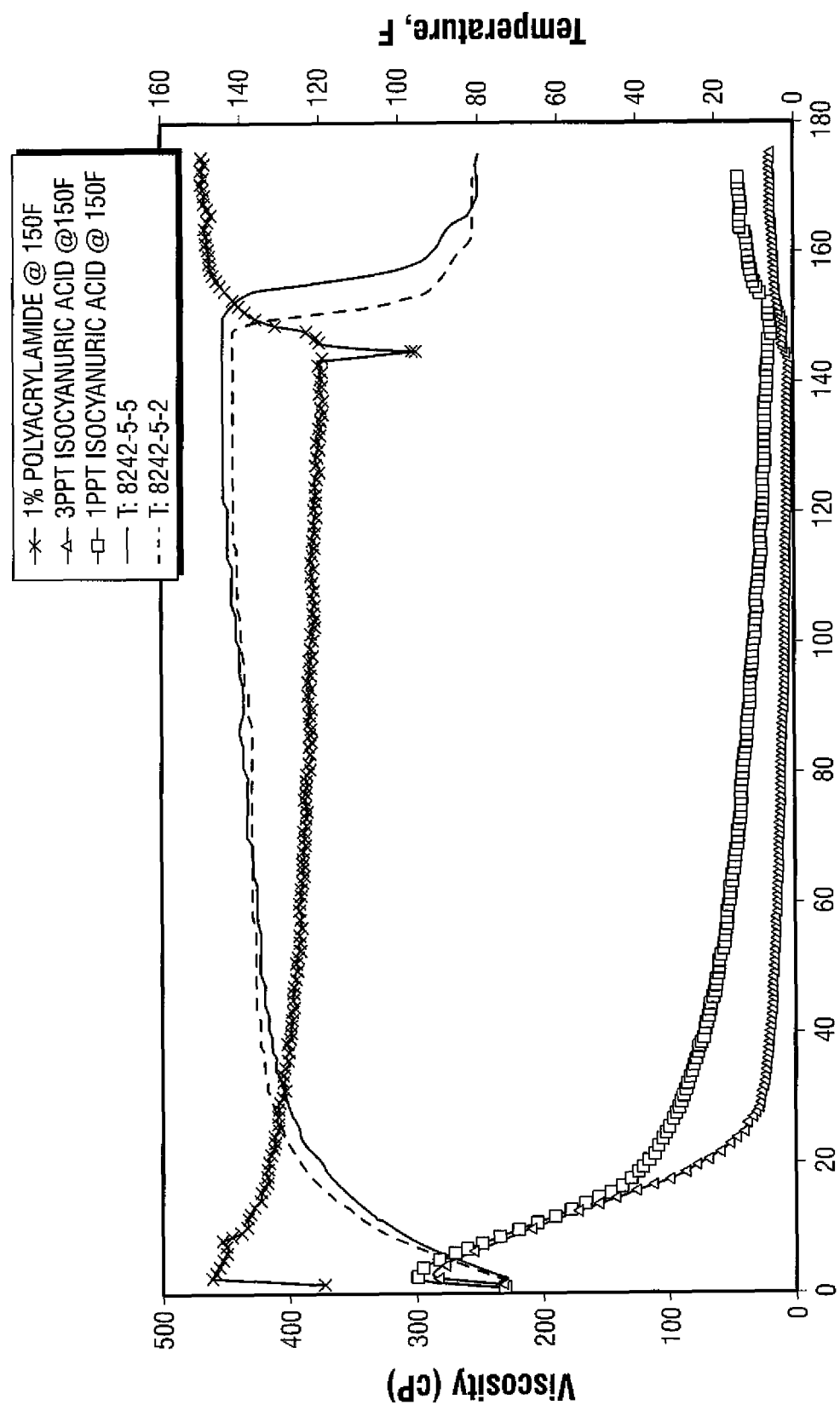
FIG. 2 shows viscosity profiles of 1% polyacrylamide with sodium salt of dichloroisocyanuric acid at 65.5° C.

In a first example, 5 g of polyacrylamide polymer were dissolved in 500 mL of de-ionized (DI) Water and hydrated for 30 min. The resulting fluid was rheologicaly tested on GRACE 5500 at 51.5° C. Another two fluids were prepared in a similar way but 5 and 3 ppt of sodium salt of dichloroisocyanuric acid were added to the samples before testing the rheology. Results are reported on FIG. 2. While fluid without sodium salt of dichloroisocyanuric acid retained the initial level of viscosity throughout the test the fluids containing it lost the viscosity rapidly upon reaching the temperature.

Figure 3:
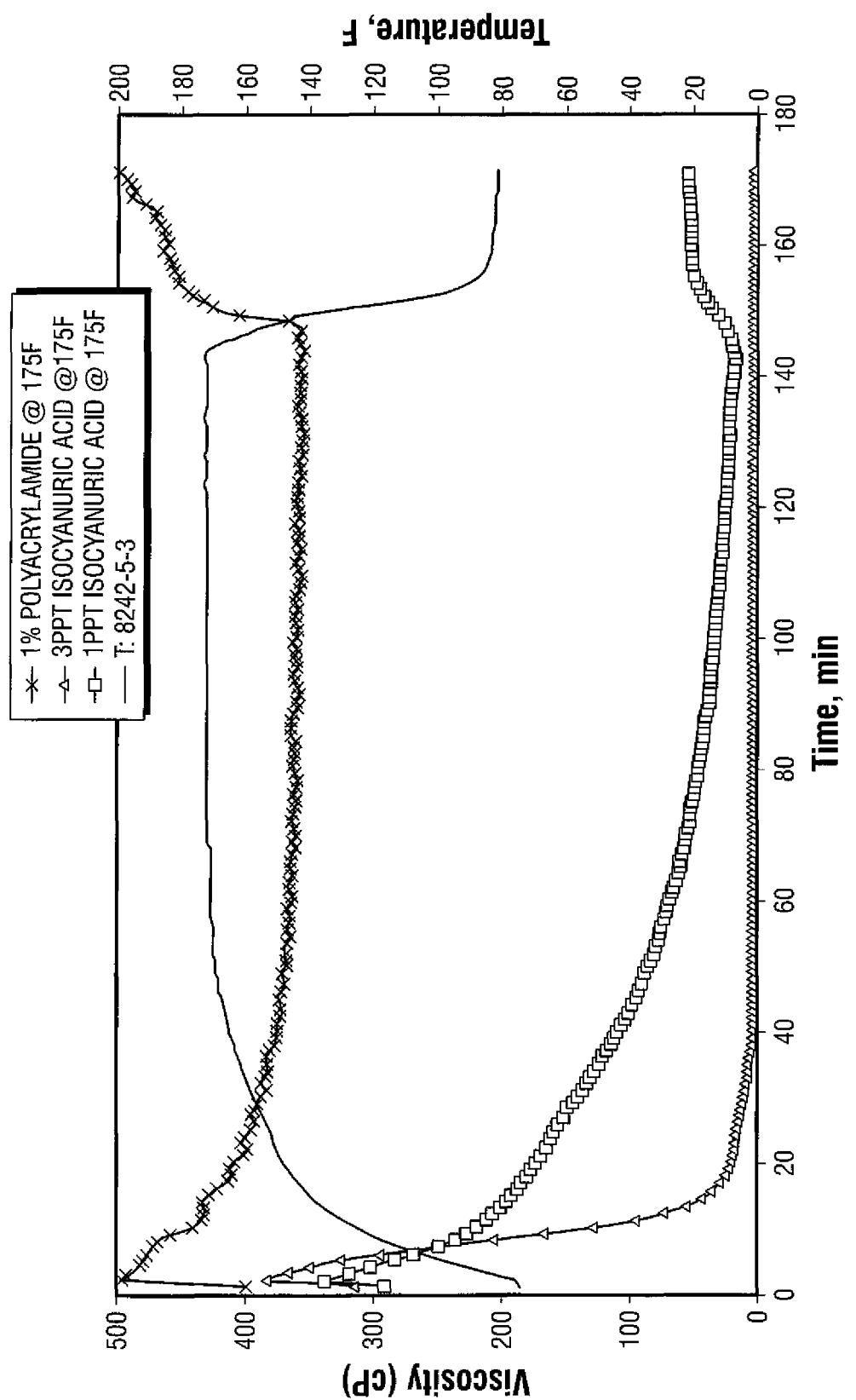
FIG. 3 shows viscosity profiles of 1% polyacrylamide with sodium salt of dichloroisocyanuric acid at 79.5° C.

In a second example, 5 g of polyacrylamide polymer were dissolved in 500 mL of DI Water and hydrated for 30 min. The resulting fluid was rheologicaly tested on GRACE 5500 at 65.5° C. Another two fluids were prepared in a similar way but 1 and 3 ppt of sodium salt of dichloroisocyanuric acid were added to the samples before testing the rheology. Results are reported in FIG. 3. While fluid without sodium salt of dichloroisocyanuric acid retained the initial level of viscosity throughout the test the fluids containing it lost the viscosity rapidly upon reaching the temperature.

Figure 4:
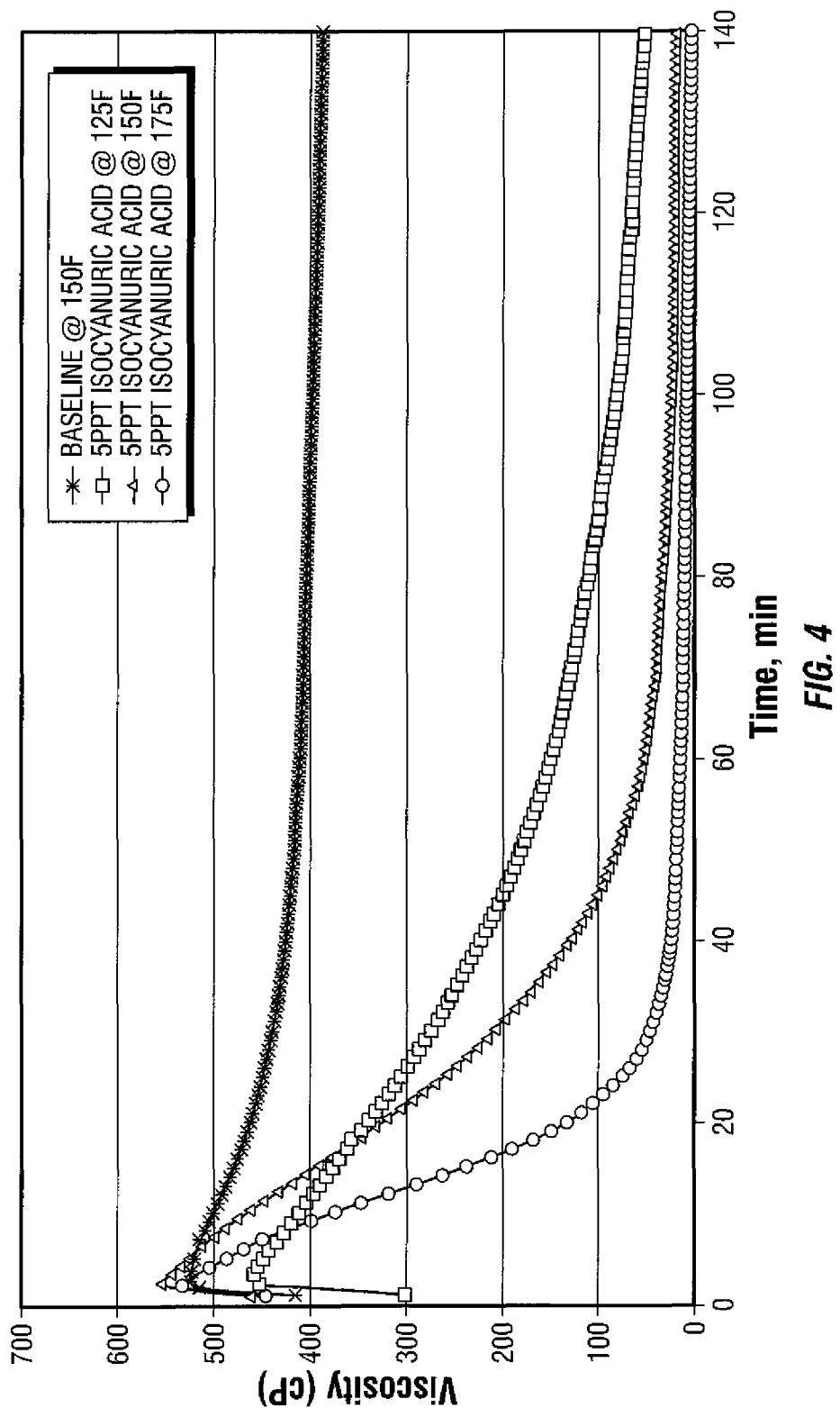
FIG. 4 shows viscosity profiles of 1% Guar gum with sodium salt of dichloroisocyanuric acid at 51.5° C., 65.5° C. and 79.5° C.

In a third example, 5 g of polyacrylamide polymer were dissolved in 500 mL of DI Water and hydrated for 30 min. The resulting fluid was rheologically tested on GRACE 5500 at 79.5° C. Another two fluids were prepared in a similar way but 1 and 3 ppt of sodium salt of dichloroisocyanuric acid were added to the samples before testing the rheology. Results are reported in FIG. 4. While fluid without sodium salt of dichloroisocyanuric acid retained the initial level of viscosity throughout the test the fluids containing it lost the viscosity rapidly upon reaching the temperature.

As can be seen from the above examples, sodium salt of dichloroisocyanuric acid in amounts ranging from 1 ppt to about 5 ppt are effective at reducing the viscosity of a well treating fluid containing 1 weight percent of polyacrylamide. Although the concentration of polyacrylamide tested in these examples is much higher than actually used in the field, it clearly show the effectiveness of sodium salt of dichloroisocyanuric acid in breaking the polyacrylamide-based friction reducer.

In a fourth example, 10 g of Guar gum were dissolved in 1000 mL of DI water and hydrated for 30 min. Resulting solution was split in five 200 mL samples and various amounts of sodium salt of dichloroisocyanuric acid were added to the samples. Rheology of the fluids prepared was tested on GRAC5600 at 100 c-1 and various temperatures. The results shown on FIG. 4 clearly demonstrate effectiveness of sodium salt of dichloroisocyanuric acid in reducing the viscosity of guar gum based fluids.

Figure 5:
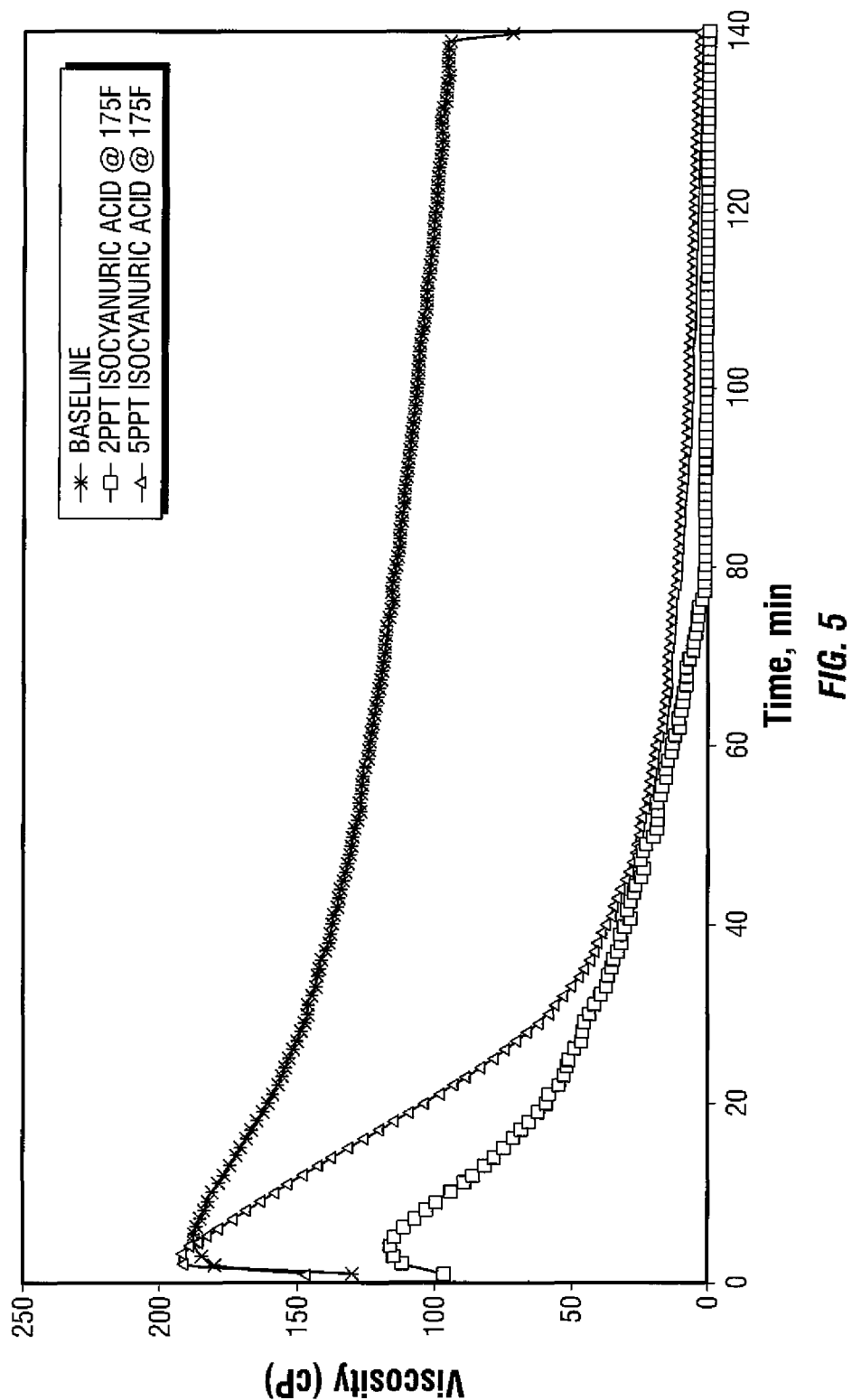
FIG. 5 shows viscosity profiles of 0.375% Xanthan gum with sodium salt of dichloroisocyanuric acid at 79.5° C.

In a fifth example, 3.75 g of Xanthan gum were dissolved in 1000 mL of DI water and hydrated for 30 min. Resulting solution was split in five 200 mL samples and various amounts of sodium salt of dichloroisocyanuric acid were added to the samples. Rheology of the fluids prepared was tested on GRAC5600 at 25 c-1 at 79.5° C. The results shown on FIG. 5 demonstrate effectiveness of sodium salt of dichloroisocyanuric acid in reducing the viscosity of Xanthan gum based fluids.

Figure 6:
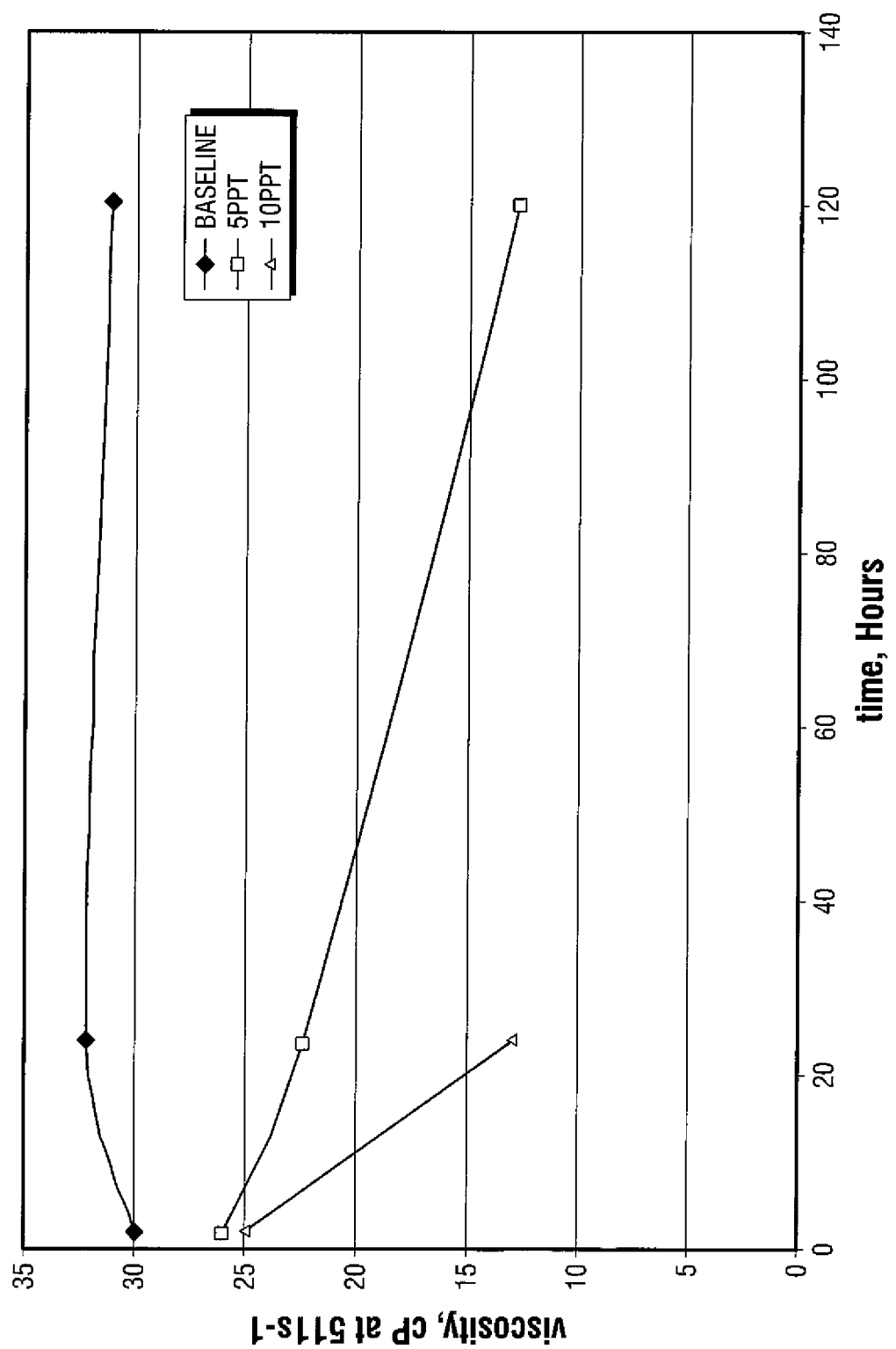
FIG. 6 shows viscosity profiles of 0.6% Xanthan gum with sodium salt of dichloroisocyanuric acid at 82° C.

In a sixth example, 6 g of Xanthan gum were dissolved in 1000 mL of 9.3 ppg KCl brine and hydrated for 30 min. Resulting solution was split in five 200 mL samples and various amounts of sodium salt of dichloroisocyanuric acid were added to the samples. The samples were placed in oven at 82° C. After 2, 24 and 120 hours the samples were taken from the oven and cooled to room temperature. Rheology of the fluids prepared was tested on FANN35 at 511 c-1 at 82° C. The results shown on FIG. 6 demonstrate effectiveness of sodium salt of dichloroisocyanuric acid in reducing the viscosity of Xanthan gum based fluids.

The foregoing disclosure and description of the embodiments is illustrative and explanatory thereof and it can be readily appreciated by those skilled in the art that various changes in the size, shape and materials, as well as in the details of the illustrated construction or combinations of the elements described herein can be made without departing from the spirit of the invention.

What is claimed is:
1. A method comprising:
   providing a fluid comprising a viscosifying agent in an aqueous medium;

contacting the fluid with an halogenisocyanuric acid selected from the group consisting of mono bromoisocyanuric acid, dibromoisocyanuric acid and tribromoisocyanuric acid; and contacting the fluid with cyanuric acid;

whereby the viscosity of the fluid with the halogenisocyanuric acid is reduced compared to the viscosity of the fluid alone; and introducing the fluid into a well.

2. The method of claim 1, wherein the aqueous medium is oilfield produced water, fresh water, seawater, brine water or mixture thereof.

3. The method of claim 1, wherein the viscosifying agent is, crosslinked or un-crosslinked polymer, friction reducer, or viscoelastic surfactant.

4. The method of claim 3, wherein the friction reducer is polyacrylamide.

5. The method of claim 4, wherein the polyacrylamide is either anionic or cationic.

6. The method of claim 1, wherein the fluid further comprises surfactant, emulsion, scale inhibitor, biocide or mixture thereof.

7. The method of claim 1, further comprising: introducing proppant into the well.

8. The method of claim 1, further comprising: energizing or foaming the fluid with a gas.

9. The method of claim 8, wherein the gas is carbon dioxide, nitrogen, air, or combined.

10. The method of claim 1, wherein the halogenisocyanuric acid concentration is from about 0.5 gpt to 2 gpt based on the volume of the fluid.

11. The method of claim 1, wherein the viscosity of the fluid alone is above about 2.5 centipoises at a temperature of about 32° C.

12. The method of claim 1, wherein the viscosity of the fluid with the halogenisocyanuric acid is below about 1 centipoise at a temperature of about 32° C.

13. The method of claim 1, wherein the cyanuric acid concentration is from about 25 ppm to about 30 ppm based on the weight of the fluid.

14. A method of treating a subterranean formation in a well comprising: providing a fluid comprising a viscosifying agent in an aqueous medium; contacting the fluid with an halogenisocyanuric acid selected from the group consisting of mono bromoisocyanuric acid, dibromoisocyanuric acid or tribromoisocyanuric acid; and contacting the fluid with cyanuric acid whereby the viscosity of the fluid with the halogenisocyanuric acid is reduced compared to the viscosity of the fluid alone; introducing the fluid into the well; and allowing the fluid to contact the subterranean formation.

15. The method of claim 14, wherein the viscosity of the fluid alone is above about 2.5 centipoises at a temperature of about 32° C.

16. The method of claim 14, wherein the viscosity of the fluid with the halogenisocyanuric acid is below about 1 centipoise at a temperature of about 32° C.

17. The method of claim 14, wherein the aqueous medium is oilfield produced water, fresh water, seawater, brine water or mixture thereof.

18. The method of claim 14, wherein the viscosifying agent is, crosslinked or un-crosslinked polymer, friction reducer, or viscoelastic surfactant.

19. The method of claim 18, wherein the friction reducer is an anionic, cationic, or nonionic friction-reducing additive, including acrylamide polymers and copolymers polyacrylamide.

20. The method of claim 18, wherein the friction reducer is polysaccharide including guar and derivatized guar.

* * * * *